Patented June 6, 1939

2,160,873

UNITED STATES PATENT OFFICE 2,160,873

REFRACTORY MATERIALS

Hans Kerla, Baltimore, Md.

No Drawing. Application May 22, 1935,
Serial No. 22,921

10 Claims. (Cl. 106—9)

The present invention is directed primarily to the production of refractory compositions from a member of the sillimanite group, and especially cyanite, and a binder of sodium silicate, no clay being necessary to produce a satisfactory product. While the refractory composition may be made from raw cyanite, it is preferred that it be made from calcined cyanite or a mixture thereof and raw cyanite, as hereinafter more fully pointed out. One of the points of novelty of the present invention is the use of such a mixture in connection with an alkali silicate as a raw mix for the production of refractories.

While an alkali silicate in a concentrated form may be used to produce either a low temperature baked potential refractory containing refractory ingredients or a high temperature fired refractory, the most satisfactory results are obtained when the water content of the alkali silicate is controlled and this, preferably, in relationship to the amount of alkali present in the alkali silicate. Alkali silicates are on the market in various concentrations ranging from approximately 33.5° Bé. to 69° Bé. or even above, the latter being the most concentrated and the former the less concentrated. The former has a higher water content, a lower silicic acid content, and a lower alkali content than the latter. Expressed differently, the higher the Bé. concentration, the higher is the alkali content of the alkali silicate or water glass, but not in a proportional relationship, therefore the same results cannot be obtained by diluting a highly concentrated water glass solution as may be obtained by diluting a less concentrated water glass solution.

The above will be somewhat clear from the following table:

Table indicating amount of water, alkali and silicic acid present in analysis of various concentrations

| Degrees Bé | 33.5° | 41° | 42.5° | 47° | 52° | 69° |
|---|---|---|---|---|---|---|
| $H_2O$ content | 68.9% | 62.1% | 60.4% | 57.8% | 53.4% | 37.5% |
| $SiO_2$ content | 24.7 | 29.0 | 30.3 | 31.2 | 32.9 | 38.3 |
| $Na_2O$ content | 6.4 | 8.9 | 9.3 | 11.0 | 13.7 | 24.2 |

Commercial 33° Bé. water glass is so viscous that it is not completely absorbed by the mineral base. In other words, it does not adequately coat or penetrate the mineral base and the result is any brick made from a mixture containing a member of the sillimanite group, and especially cyanite, and such water glass, while giving a refractory that may be used for some purposes, does not give such a refractory as is desirable for especially high temperature use. Further, highly viscous water glass renders it difficult to remove shaped articles from the molds. It is of course apparent that such highly viscous water-glass may be used, but that it involves difficulties from a commercial standpoint, as special precautions would be necessary to remove the formed articles from the molds. Therefore, if the water content of the water glass is controlled, it is distinctly advantageous. On the other hand, if the waterglass is too highly diluted, its bonding properties are materially reduced and there is a tendency for the sodium silicate to exude from a formed article or such a brick either at a low baking temperature or a high baking temperature, thereby rendering the article undesirable for some refractory purposes. Additionally, high water dilution means that the binder has a low silicic acid content, and this has an influence upon the final properties of the refractory, not only for high temperature use but for extremely high temperature use.

It is, therefore, apparent that while for some purposes concentrated waterglass may be used to bind a member of the sillimanite group, especially cyanites, the best and most satisfactory results are obtained by using an alkali silicate, for example waterglass, having a controlled water and alkali content, and of proper viscosity.

Most satisfactory results are obtained by taking commercial 47° Bé. waterglass and adding thereto between 25% and 40% of water by volume to produce a waterglass concentration varying between 41° and 39° Bé. Satisfactory results may be obtained by using commercial 41° Bé. waterglass, as this has a sufficient water-content and mobility. The 41° Bé. waterglass may be diluted with between 20 and 25% of water by volume to produce a waterglass having a gravity varying between 37° Bé. and 36° Bé. However, baked and fired bricks produced with 41° Bé. waterglass are much stronger than bricks produced with lower Bé. degree waterglass.

The control which it is desired to obtain over the sodium silicate may be illustrated by considering the physical characteristics and chemical constitution of 41° Bé. waterglass, which gives very good results. In the first place, this degree Bé. waterglass has a sufficient water content and mobility, and therefore can be adequately absorbed by the mineral base and at the same time eliminate difficulty in removing the formed articles containing the sodium silicate from the molds. 41° Bé. waterglass has a water content of 62.1%. This is a low water content in the sense that in the previous binding of refractories the sodium silicate used has not been the 41° Bé. sodium silicate but 33 to 41° or somewhat higher Bé. waterglass diluted with water, approximately two parts of water to one of the silicate, so in actual practice the silicate binder which has been used has always had an exceedingly higher water content. Considering the alkali content of a 41° Bé. solution, there is present 8.9% alkali expressed as $Na_2O$. It is to be noted that the alkali content is low as compared to, for example, a 52° Bé. solution which contains 13.7% alkali. The silica content is also low, there being present 21% silica.

In view of the above, it is clear that a solution of 41° Bé. has a low water content and a low alkali content, and at the same time is not too viscous to be properly used to exert its properties as a binder.

The above examples are merely illustrative of the most satisfactory dilutions and are not to be taken by way of limitation. For most satisfactory results, the Bé. solution may have a somewhat higher concentration than 34° Bé. However, as the concentrations depart from the preferred concentrations, the results are not quite so satisfactory.

The point is here made that the present invention is directed broadly to a refractory composition, either a low temperature baked product or a high temperature fired product. In its preferred form, the invention involves the use of an alkali silicate of controlled water-content, this giving the most satisfactory results and especially from the standpoint of strength and sag.

The present invention in its preferred form is also directed to a refractory composition capable of being handled and shipped and adapted to develop its refractory characteristics under service conditions. In its more specific aspect, there is provided a low temperature baked refractory composition adapted to be initially utilized in its baked condition as a potential refractory and to develop its refractory characteristics under service conditions. Such a product may be made by mixing a member of the sillimanite group, and especially cyanite, with waterglass, forming from said mixture under pressure a shaped article, and subjecting the article to a heat treatment to allow the same to set and develop sufficient strength for handling and shipping. Preferably, the water content of the alkali silicate, such as waterglass, is controlled and the waterglass is present in an amount insufficient to adversely affect the strength of the brick when baked, and its refractory characteristics under service conditions including strength and sag. In other words, one of the features of the present invention viewed in its more specific aspect is the provision of a low temperature baked brick made from a member of the sillimanite group, and especially cyanite, and bonded with sodium silicate, the brick being heat treated to accelerate the set and allow it to develop sufficient strength for handling and shipping. Such bricks may be sold for installation wherever a high temperature refractory is needed and allowed to develop very refractory characteristics under the service temperature. It is apparent that this procedure is of enormous value from an economical standpoint, as it is not necessary to first fire the bricks to convert them into a high temperature refractory and then install the bricks under service conditions, as for example in a furnace, and bring the latter up to high heat. When making a refractory lining or a continuous refractory container of any character, it is necessary to use a mortar to bind the bricks together, and this mortar is preferably of the same character as the raw mix used for producing the bricks. The mortar may be brought to the plasticity or mobility desired by intermixing proper amounts of soluble silicates and calcined cyanite. In this manner a desirable workability of the mix is obtained. Mortars of this type will resist to cone 34 and above. After the bricks are set in place in the mortar, the lining or refractory container is heated to a suitable low temperature to set the mortar. After the latter heating step, the furnace or refractory container is ready for use and a raw mix which it is desired to treat may be introduced therein.

In a modified form of the invention, the raw mix instead of being made into a brick and baked may be used to form a monolithic lining. Raw mixtures of cyanite and an alkali silicate may also be applied in a plastic or semi-plastic state to the burners or metallic combustion chambers of stoves, oil burners and the like. Due to the volumetric stability of my silicate compositions under high and low temperatures as well as their high adhesiveness an intimate contact between metals and the refractory composition is obtained. Since refractory, monolithic linings for domestic metal stoves, oil burners, etc., are usually exposed only to moderate temperatures, it is unnecessary to such refractory linings containing aggregates having the high refractoriness as cyanite, sillimanite, etc. Any other refractory aggregates are suitable for such purposes provided they possess the necessary volumetric stability at those temperatures to which they are exposed under actual service conditions. Calcined flint clay, slag, crushed flint clay, ganister bricks, etc., may replace in this case cyanite, sillimanite and the like aggregates. If lightweight, monolithic linings are desired, I may use blast furnace slag or similar light materials in combination with my silicate solutions. Cyanite, for example, is mixed with the sodium silicate and rammed in under pressure to form a lining in situ. The lining is heated to a low temperature to set the mixture and is then ready to be used, the refractory characteristics of the mixture being developed under high temperature service conditions.

While the above represents broadly the novelty of the present invention, the following discoveries have also been made:

1. The effect of increasing the pressure under which the brick is formed is to markedly increase the strength of the low temperature baked brick and the high temperature fired brick.

2. Forming pressures have been used varying between 700 pounds per square inch and 10,000 pounds per square inch. Good results have been obtained when using a forming pressure of 4,200 pounds per square inch. The best results are obtained when using a forming pressure of 10,000 pounds per square inch. The higher the pressure, the higher the density of the bricks and the lower the sag and absorption properties of the brick. In other words, with high pressures the porosity of the resulting brick is less.

3. The sag of the brick produced under high temperature conditions such as encountered in industrial application is less when a high forming pressure is used.

4. The percentage of alkali silicate binder present in the raw refractory mix has a decided influence on the strength of the low-temperature baked brick and high-temperature fired brick produced either under service conditions, that is, formed in situ or fired at a high temperature to produce a finished refractory adapted to be used in that condition. Using 10% of waterglass of low water-content, for example 39° Bé. waterglass, this amount being taken on the weight of the cyanite used, and using high and low forming pressures, the strength of the baked and fire treated ware was markedly increased, as compared to a similar brick formed with 6% of a waterglass binder of the same gravity.

5. When raw cyanite is used as the mineral base, a high temperature fired brick of high porosity is produced, since the raw cyanite possesses the property of increasing in volume at high temperatures. For example, when calcining at 2400 to 2600° F., there is a volume increase of about 16%. At higher temperatures, there is a greater increase. Therefore, when it is desired to produce for a special purpose a high temperature refractory of great porosity, the raw cyanite is used. When a high temperature refractory of low porosity is desired, calcined cyanite is used or a mixture of raw cyanite and calcined cyanite. The expansion taking place in a brick produced in accordance with the present invention, and containing substantially only raw cyanite, under actual service conditions is also somewhat influenced by the fineness of the raw cyanite present. The finer the raw cyanite, the less expansion occurs. Using a mixture of finely divided raw cyanite and coarsely divided calcined cyanite, the mixture does not have any expansion properties but instead shows a very small shrinkage at a firing temperature of 2600° F. and not considerably greater at 3,000° F.

6. Fairly rapid drying of the low temperature is desirable to produce the most satisfactory baked product and for the latter to develop the most desirable refractory characteristics under service.

The following examples are to be taken as illustrative of the invention and not by way of limitation:

100 pounds of calcined cyanite are reduced so that it passes through a 3-mesh screen. Some of the so reduced cyanite will of course be finer than 3-mesh, and therefore the reduced cyanite may be termed a composite aggregate containing coarse particles and fine particles. A mixture of this type gives satisfactory results. However, it may be pointed out that the finer the mesh of the calcined cyanite the lower the forming pressure necessary to convert the same into bricks, and the fineness has some influence on the final physical characteristics of brick. Waterglass of 41 to 47° Bé. is diluted with 25 to 40% of water. When 41° Bé. waterglass is diluted with 25% water, there is obtained a final waterglass solution of about 36° Bé. and when it is diluted with 40% water about 34° Bé. waterglass solution is produced. When 25% of water is added to a 47° Bé. waterglass, a 41° solution is produced, and when 40% of water is added about 39° Bé. solution is produced. Ten pounds of any of these waterglass solutions may be added to 100 pounds of calcined cyanite and the mass well mixed, and thereafter pressed into the shape by ramming or by utilizing hydraulic pressure. In order to obtain products of high density, a pressure of 3 to 5 tons per square inch may be used. It may be pointed out that the higher the pressure employed, the denser is the resulting product. Further, the higher the pressure applied, the less is the resulting sag and porosity in the high temperature fired brick. When low forming pressure is employed, it is preferred that the composite calcined aggregates have more fines present than when a higher forming pressure is employed, as this is conducive to obtaining a uniform density.

The bricks formed under pressure preferably should not be exposed to the air for any considerable time unless they are dried. Bricks which are not dried, on exposure to the air, effloresce, and this interferes with the refractoriness of the finished burned brick. Therefore, it is desirable to dry the green bricks as soon as possible. One suitable method of procedure is to heat the bricks to a temperature varying between 200 and 300° F., depending upon the size of the bricks for about five to six hours. Thereafter, the temperature is gradually raised to 600° F. for an additional period of about 6 hours. This temperature may be exceeded. It may be pointed out that the higher the burning temperature, the stronger the product. However, in one form of the invention it is not desired to produce an intermediate low baked of very high strength, the object simply being to provide such a brick that will enable it to be handled and shipped. Such a brick thereafter develops its refractory characteristics under service conditions. The final temperature of 600° F. is sufficient for the manufacture of bricks which are strong enough for the purpose set forth. However, it is to be pointed out that the present invention is not limited to the specific temperature range set forth. The heat treatment may vary and broadly stated should be sufficient to allow the mixture to set and develop adequate strength for handling and shipping.

It may be pointed out that the low temperature burning process results in a considerable fuel saving and therefore from an economic standpoint is of decided advantage. The present invention is not to be taken as limited to the production of a low temperature baked brick which has afterwards to develop its refractory characteristics under service. Under some conditions it may be desirable to form bricks at high temperatures to make a finished product of high refractoriness, including high strength and litttle sag.

A brick produced in accordance with the above from calcined cyanite stands a temperature varying between that denoted by cones 34 and 36. A standard size brick 9" x 4½" x 2½", which has been baked at 600° F. had a loading resistance of 25 pounds per square inch at 2650° F. At this pressure the deformation was about 1½%. The porosity of the brick produced depends upon the pressure utilized. Using a pressure of 4 tons per square inch, a brick burned at 2750° F. showed a porosity of 25% and below. A brick formed under 3 tons pressure and burned at the same temperature showed a porosity of 35% and below.

In another series of tests, 50 parts by weight of coarse 8 mesh calcined cyanite was mixed with 50 parts fine 80 mesh raw cyanite. Separate portions of such a mixture were mixed with 34° Bé. and 39° Bé. sodium silicate in the proportion 6% to 10% respectively by weight of the sodium silicate taken on the cyanite aggregate. Mixes of this character were formed into shaped articles under pressures of 700 and 4,200 pounds per square inch respectively. A pressure of 700 pounds represents approximately the pressure effect obtained by hand ramming. The shaped articles were in the form of bars of approximately 1″ x 1″ x 5″. Some of the bricks were dried at 200°, others at 300°, and others at 1700° F. Raising the temperature from 200 to 400° increases the strength to about 25% of the low temperature baked brick over that obtained by heating at 200°. There was some advantage in heating to 1700°, but it was so little that for the purpose of final tests 400° was selected as the best drying temperature considering all the factors involved. The bars heat treated at 400° were tested for shrinkage and strength and then fired to 2600° and again tested. Some of the bars were thereafter refired at 3,000° F. suspended over a 3-inch suspension to determine the sag which is usual and gives data proportional to load test results. Other bars were heat treated to 300° F. and tested for shrinkage. In order to check the results obtained, bricks were made up of the mixture set forth and fired to 3000° F. over a suspension of 7 inches and the sag noted. This was noted in comparison with a high grade diaspore brick. The brick covered by the present invention gave refractory characteristics which indicate its great superiority over the diaspore brick. The following table sets forth the results of the experiments:

dalusite and cyanite. It is not desired to be limited by any theory as to what occurs when a mixture prepared as set forth is fired at a high temperature either under service conditions or prior to being used under service conditions, but it is probable that these minerals are converted into mullite, which may appear in different allotropic conditions.

While it is indicated that the minerals of the sillimanite group are alumino-silicates, it is to be understood that some impurities may be and are usually present. The impurities may be iron, calcium, magnesium, sodium and the like, although usually the chief impurity is iron. American cyanite contains considerably more impurities than cyanite imported from India. The American cyanite is relatively easily ground, but this is not true of the cyanite imported from India. American cyanite produced from Virginia geological formations has been treated in accordance with the present invention and the experimental data herein set forth will present the results obtained by using this American cyanite in the raw or calcined condition, and with mixtures of raw or calcined cyanite. Other experiments have been made with cyanite imported from India, the Indian cyanite being used prefer-

| Bond | Bé. | Per cent used | Forming pressure | Dried 400° F. Mod. of rupt., lbs. sq. in. | Fired 2,600° F. Mod. of rupt., lbs. sq. in. | Shrinkage percent linear | Reheated 3,000° F. Mod. of rupt., lbs. sq. in. | Shrinkage sag Percent linear | Shrinkage sag Percent of length |
|---|---|---|---|---|---|---|---|---|---|
| Waterglass | 34° | 6 | 700 | 62 | 170 | 0.3 | | | 4.0 |
| | | | 4,200 | 98 | 775 | .3 | 1,871 | 2.0 | 1.6 |
| | | 10 | 700 | 143 | 469 | .4 | 1,764 | 1.9 | 2.3 |
| | | | 4,200 | 550 | 724 | .5 | | | 1.7 |
| | 39° | 6 | 700 | 60 | 296 | .2 | | | °3.0 |
| | | | 4,200 | 207 | 775 | .2 | | | 1.2 |
| | | 10 | 700 | 226 | 330 | .3 | 2,016 | 1.1 | 2.8 |
| | | | 4,200 | 616 | 869 | .4 | 2,047 | | 1.7 |
| Bindex | | 6 | 700 | 18 | 157 | 0 | | | °4.0 |
| | | | 4,200 | | | 0 | 1,228 | 2.0 | °4.0 |
| | | 10 | 700 | 93 | 145 | 0 | | | |
| | | | 4,200 | | | 0 | | | |

Note.—° Cracked.

In order to clearly indicate the advantages residing in using a waterglass binder in the mix herein set forth, the same material was mixed with a temporary bond of bindex which is an organic preparation on the market.

Porous bricks may be made from raw cyanite by taking 100 pounds of 60 mesh or finer material and mixing the same with 10% by weight taken on the cyanite of 36° Bé. to 39° Bé. waterglass. This material may be formed into bricks under low pressure, for example 500 pounds per square inch, and then heat treated at a low temperature, preferably varying between 200 to 600° C. to dry the same. The drying period will vary in accordance with the circumstances, but in general between 9 and 12 hours are sufficient. After the bricks are dried, they may be calcined at a suitable temperature depending upon the purpose for which the final refractory brick is to be used. They may be calcined up to a temperature of 3,000° F. In order to increase the porosity of the final brick, the raw mix may have added thereto a cellulosic or carbonaceous material which will burn out under heat treatment.

It is desired to point out the present invention is applicable to members of the sillimanite group which are all alumino-silicate minerals. Some of the members of this group are sillimanite, anably in the calcined state. It gives results comparable to that obtained by using American cyanite.

It is desired to point out that broad protection is desired upon the production of a raw mix for ceramic purposes containing a mixture of a raw and calcined member or members of the sillimanite group and especially cyanite, and the production of refractories therefrom. It is of course evident that in such a mixture the fineness of the raw and calcined material may vary. It may be pointed out that when the raw cyanite is used with calcined cyanite the resulting brick has less expansion when the raw cyanite is finely divided, for example between 80 to 100 mesh. The binder herein set forth is the preferred binder for such a mix, but it is to be distinctly understood that as to this feature of the invention other binders will function, although not as well as the alkali silicate binder herein disclosed. The point that I wish to bring out is that the present invention, as far as a mixture of raw and calcined material is concerned, is not limited to the particular binders herein set forth, but that many of the prior art binders may be used. The provision of a mixture of raw and calcined material opens the way for a distinct control of the properties of the resulting refractory. The calcined material has under high heat shrinkage properties, and the uncalcined material has expansion properties. By combining the raw and the calcined material in varying proportions, the expansion or contraction of the resulting product may be controlled. This is an important step in advance in the art of providing high temperature refractories from members of the sillimanite group.

In the above disclosure, the properties and the use of various types of alkali silicate solutions have been discussed. However, it is desired to basically state the contribution which has been made to the art of producing sillimanite refractories. On one hand, an alkali binder has been selected which has a low water content. However, the low water content is not the only factor to be considered. The low water content gives the binder the requisite bonding properties to preliminarily bind the material, this water of course evaporating under heat treatment. Of equal importance is the control of the alkali content of the alkali silicate, it being desired that the alkali silicate have a low alkali content. In other words, for the most successful results, in accordance with the present invention the alkali silicate must have the proper binding properties and at the same time a low alkali content. While various concentrations have been given, these are all merely illustrative of suitable concentrations and the invention is not limited to these specific concentrations. What it is desired to cover is the broad idea of providing a binder for members of the sillimanite group which will properly bind and at the same time furnish only a small amount of alkali constituent. When these conditions are observed, the resulting refractory has the desirable properties hithertofore pointed out.

While in the specific examples given it has been stated that 6 to 10% of the binder is used, the invention is not limited to such percentages. Broadly stated, the amount of binder used will depend upon the physical characteristics of the mineral base, including the mesh thereof, and its inherent absorption qualities. The character of the alkali silicate added will also influence the amount thereof. Just how much alkali silicate to add can be determined in each case by a consideration of the various factors involved, including those set forth above. Results have been obtained using as much as 20% of 41° Bé. waterglass, but these results are not as satisfactory as when 10% is used. However, the above will indicate that the percentages set forth of the amount of silicate added are illustrative and are not to be taken by way of limitation when the invention is considered in its broadest aspect. In the preferred form of the invention these figures represent the best results that have been obtained through a long series of experiments.

I wish, furthermore, to emphasize that the term "waterglass", employed in the appended claims, embraces sodium and potassium silicates.

What I claim is:

1. As a new composition of matter, a raw refractory mix adapted to be formed into a baked article or a fired article and consisting of a member of the sillimanite group and an alkali silicate of about 36 to 41° Bé., the latter being insufficient to adversely affect the strength of baked products made therefrom and the refractory characteristics under service conditions of fired products.

2. As a new composition of matter a raw refractory mix adapted to be formed into a baked article or a fired article and consisting of cyanite and an alkali silicate of about 36 to 41° Bé., the latter being insufficient to adversely affect the strength of baked products made therefrom and the refractory characteristics under service conditions of fired products.

3. As a new composition of matter a raw refractory mix consisting of a member of the sillimanite group and an alkali silicate of about 36 to 41° Bé.

4. As a new composition of matter a raw refractory mix consisting of cyanite and an alkali silicate of about 36 to 41° Bé.

5. A high temperature fired refractory consisting of the reaction products of a member of the sillimanite group and an alkali silicate of about 36 to 41° Bé.

6. A high temperature fired refractory consisting of the reaction products of cyanite and an alkali silicate of about 36 to 41° Bé.

7. As a new composition of matter a raw refractory mix consisting of a member of the sillimanite group and a sodium silicate of about 36 to 41° Bé.

8. As a new composition of matter a raw refractory mix consisting of cyanite and a sodium silicate of about 36 to 41° Bé.

9. A high temperature fired refractory consisting of the reaction products of a member of the sillimanite group and a sodium silicate of about 36 to 41° Bé.

10. A high temperature fired refractory consisting of the reaction products of cyanite and a sodium silicate of about 36 to 41° Bé.

HANS KERLA.